United States Patent [19]
Koenig

[11] Patent Number: 4,573,125
[45] Date of Patent: Feb. 25, 1986

[54] FLIGHT CONTROL SYSTEM ESPECIALLY FOR HELICOPTERS

[75] Inventor: Herbert Koenig, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 479,572

[22] Filed: Mar. 28, 1983

[30] Foreign Application Priority Data

Apr. 7, 1982 [DE] Fed. Rep. of Germany ....... 3212950

[51] Int. Cl.$^4$ ............................................. B64C 13/00
[52] U.S. Cl. .................................. 364/434; 244/17.13
[58] Field of Search ............... 364/434, 161, 162, 176, 364/183; 244/17.13, 221; 318/609–611, 632; 73/178 H

[56] References Cited

U.S. PATENT DOCUMENTS

| | | | |
|---|---|---|---|
| 3,696,282 | 10/1972 | Hirokawa et al. | 318/610 |
| 4,198,017 | 4/1980 | Murray | 364/434 |
| 4,214,300 | 7/1980 | Barlow et al. | 318/610 |
| 4,313,165 | 1/1982 | Clelford et al. | 364/161 |
| 4,336,594 | 6/1982 | Masuzawa et al. | 318/610 |
| 4,366,422 | 12/1982 | Rhodes | 318/609 |

Primary Examiner—Gary Chin
Attorney, Agent, or Firm—W. G. Fasse; D. H. Kane, Jr.

[57] ABSTRACT

A flight control system including a mechanical control link (10) may have inherent destabilizing characteristics. Such inherent characteristics may be caused by play in the mechanical control link of the system, by friction losses, by elasticity phenomena, and by hysteresis effects. For neutralizing such inherent effects a flight control system is provided with an internal control circuit (20) having an integration stage (36) followed by an amplifier (38) providing a control correction signal (y) at its output. The control correction signal (y) is supplied to an electro-hydraulic control drive (40) which applies the correction signal (y) to a signal combining stage (42) at the input of the mechanical control link (10). The input to the integration stage is an internal control deviation signal (e) which includes a signal component (x) representing the destabilizing inherent characteristics and a signal component (w) representing flight control closed loop input signals providing a respective reference signal (w). The operation of the integration stage is such that the correction signal (y) rises rapidly even in response to small deviation signals (e) for achieving the neutralizing.

11 Claims, 1 Drawing Figure

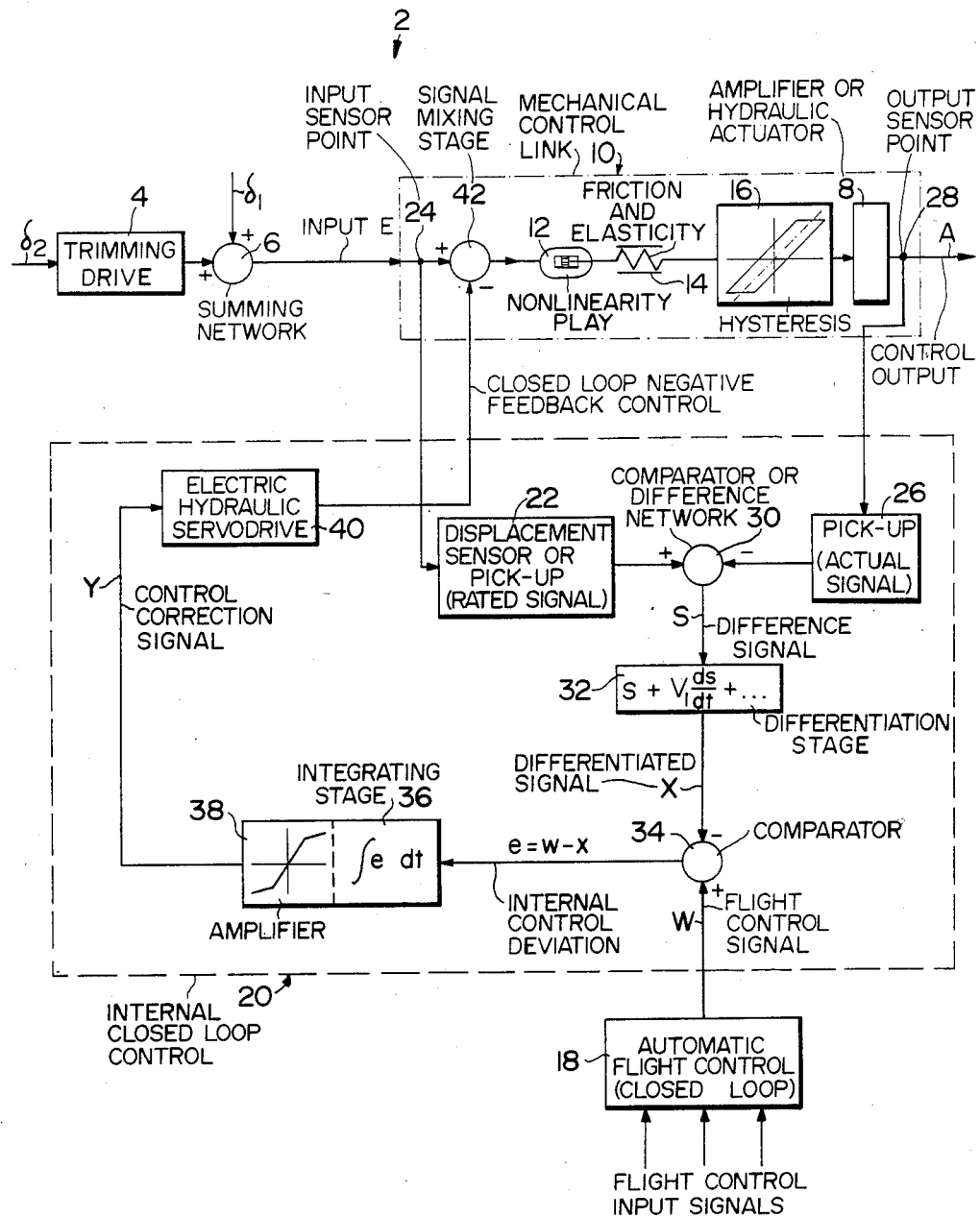

FLIGHT CONTROL SYSTEM ESPECIALLY FOR HELICOPTERS

BACKGROUND OF THE INVENTION

The invention relates to a flight control system, especially for helicopters. Such flight control systems have at least one mechanical control link for transmitting a mechanical control signal and an internal closed loop control cooperating with the mechanical control link. The internal closed loop control has two pick-ups for providing two electrical signals, one of which is picked-up at the input of the mechaical control link and the other of which is pick-up at the output of the mechanical control link. A circuit arrangement for producing a signal difference between the two pick-up signals forms part of the closed loop control. This difference signal represents a control deviation which is used for producing a correction signal. The correction signal in turn is used to control a servodrive connected to the mechanical control link just downstream of the signal pick-up at the input of the mechanical control link as viewed in the signal flow direction.

Prior art mechanical control links, especially having a plurality of individual elements as they are used, for example, in flight control systems are subject to a nonlinear hysteresis type of signal transmission. Such transmission may have a plurality of causes, including mechanical play, friction effects, elasticity phenomena and combinations thereof. As a result of these nonlinear hysteresis type characteristics of prior art mechanical control links such links are subject to inaccuracies in the control as well as to continuous oscillations having a relatively low frequency and a large amplitude resulting in so-called limit cycles. Particularly in connection with helicopters equipped with such control systems the limit cycles have been found to be rather disturbing, especially with regard to the flight characteristics of the helicopter.

Efforts to mechanically reduce such characteristics of mechanical control links have had limited success, if any, and such mechanical efforts involve a high manufacturing investment and high costs. Mechanical efforts to reduce such characteristics have their own limitations, because, for example, making the mechanical control link shorter cannot be accomplished beyond a certain point and the same applies to constructing the movable joints of the mechanical control link to have as little play as possible.

It has been found that in a control system as described above, the instabilities in the form of continuous oscillations or limit cycles could not be eliminated. At best, such instabilities may could be slightly reduced. This applies especially in those systems where automatic control signals are applied to the mechanical control link. Such automatic control signals may come, for example, from an automatic pilot in addition to, or instead of the manual control signals given by the pilot.

OBJECTS OF THE INVENTION

In view of the above it is the aim of the invention to achieve the following objects singly or in combination:

to construct a flight control system so that disturbing characteristics, such as play, friction losses, elasticity phenomena, hysteresis effects and the like, which are inherent in a mechanical control link of a flight control system, are substantially neutralized in their effect;

to improve the quality of the closed loop flight control by generating a control correction signal which takes these mentioned disturbing, yet inherent characteristics into account;

to improve the precision and reliability of the flight dynamic characteristics of an aircraft, especially a helicopter;

to amplify the integrated control signal in accordance with a predetermined amplification characteristic;

to damp the correction signal prior to its integration for reducing any excessive oscillations which exceed the non-linearity limits of the mechanical control link;

to free the flight control signal transmission from disturbing so-calld continuous oscillations; and to include a closed loop flight controller or autopilot signal as a reference input value for an internal closed loop control circuit.

SUMMARY OF THE INVENTION

According to the invention the above mentioned correction signal produced in the internal closed loop control is produced by integrating the control deviations in an integration circuit stage located upstream of the servo-drive or motor for the mechanical control link.

The control according to the invention is based on the recognition that the destabilizing nonlinearities such as play in the mechanical control link may be neutralized by applying a correction signal continuously and with a high frequency to the mechanical control link. The correction signal is produced by integration of the closed loop control deviation and the just mentioned frequency is sufficiently high so that a quasirigid coupling free of play is established between the input and output of the mechanical control link. It has been found that in this manner it is possible to avoid the occurrence of limit cycles which, compared to the frequency of the correction signal, have a relatively low frequency. It has been found that such integration guarantees, even where a high amplification is employed, a high precision and reliability or stability of the flight dynamic characteristics while simultaneously requiring a rather small structural investment. Such precision and stability or reliability could not be achieved heretofore. Further, the control system according to the invention is very well suited for all applications in which it is necessary to eliminate the effects of all destabilizing nonlinearities resulting from the mechanical control link or signal transmission. The system according to the invention is especially advantageous in connection with the flight control of a helicopter because helicopters react in a highly sensitive manner in their flight dynamic characteristics in response to a control which is subject to hysteresis type effects. Thus, heretofore, helicopters required a very involved steering rod system, for example, for adjusting the blade angles.

The operational effectiveness of the internal closed loop control according to the invention for neutralizing the hysteresis or dead zone of the mechanical control link may be increased by amplifying the correction signal at the output of the integrating circuit stage and prior to applying the correction signal to the servo-drive. The respective amplifier connected to the output of the integration circuit stage has preferably an amplification factor or characteristic capable of increasing the transmission precision of the mechanical control link to such an extent that the stability limits are achieved. Such stability limits are always present in real systems due to the higher frequency components in the dynamic characteristics.

Another advantage of the invention is achieved by damping the deviation signal in a differentiating circuit having a predetermined characteristic. The differentiating circuit is connected between the output of the comparator which produces the difference signal and the input of the integrating circuit. Thus, it is possible to eliminate excess vibrations of the mechanical control link. On the other hand, dynamic components of higher frequency of the characteristic of the mechanical control link may be expanded so to speak in spite of the damping of the excess vibration spikes.

The internal closed loop control may be influenced by the output signals from a flight control or automatic pilot. For this purpose the output signals of the automatic pilot are applied to one input of a comparator, the other input of which is connected to the output of the differentiating circuit or if no differentiating circuit is used, to the output of the first comparator which compares the output signals of the above mentioned pickups. This feature assures a signal transmission which is free of disturbing continuous oscillations This feature even frees the automatic pilot output signals of such disturbances which is an especially critical advantage of the invention. This advantage is achieved even without using an additional servodrive upstream of the signal pick-up at the input of the mechanical control link. The term "upstream" in this context is to be understood with reference to the direction of signal transmission from the input to the output of the mechanical control link. The combination of the above outlined features also significantly improves the quality or accuracy of the closed loop flight control. According to these features the automatic pilot and the internal closed loop control are connected in series with regard to their function. The output signal of the automatic pilot is used as a further reference input for the internal closed loop control in order to adapt the correction signal to the output signal of the automatic pilot. This adaptation makes sure that the hysteresis dead zone of the mechanical control link is passed through with that speed and frequency which are the most advantageous for the respective automatic pilot output signal.

Preferably, the comparator is connected to the output of the differentiation circuit so that the output signal of the automatic pilot is compared with the output signal of the differentiation stage.

BRIEF FIGURE DESCRIPTION

In order that the invention may be clearly understood, it will now be described, by way of example, with reference to the single FIGURE of the accompanying drawing, wherein the flight control system is shown to include a mechanical control link as well as an internal closed loop control and an automatic pilot, whereby all elements are shown in block form because these components as such are well known in the art.

DETAILED DESCRIPTION OF A PREFERRED EXAMPLE EMBODIMENT AND OF THE BEST MODE OF THE INVENTION

The flight control system shown is used for transmitting and power amplifying of flight control signals which are generated by the pilot on the one hand in the form of manual control command signals $\delta1$ and on the other hand in the form of trimming signals $\delta2$ derived from a trimmng drive 4, the output of which is connected to one input of a signal summing network 6. The other input of the summing network 6 is connected to receive the steering command signals $\delta1$ coming, for example, from the control stick of the pilot. A mechanical control link 10 is connected with its input E to the output of the summing network 6. Between the input E and an output A of the mechanical link 10 there may be arranged, for example, a hydraulic booster or amplifier 8 for transmitting the pilot emanating control signal to the dynamic control of an aircraft such as a helicopter. Such dynamic control may be used, for example, for adjusting the blade angle of the rotor blades of a helicopter rotor. The dynamic control itself for the adjustment of the blade angle is not shown, but it is connected to the output A of the mechanical control link 10.

The mechanical control link 10 has inherent nonlinearities which are shown symbolically by play 12 in the linkage, by a friction and elasticity symbol 14 and possible other characteristics not shown. Due to these nonlinearities a signal to be transmitted from the input E to the output A of the link 10 is subject to instabilities represented by a hysteresis symbol 16. As a result, the transmission of the signal through the link 10 is not precise and flight mechanical continuous oscillations may be the result. Such continuous oscillations may be especially pronounced if the mechanical control link 10 must transmit in addition to the pilot initiated signal, signals coming from the automatic pilot 18. The signals from the automatic pilot 18 and the signals $\delta1$, $\delta2$ are combined or mixed in a signal mixing stage 42 just downstream of the input E. In any event, either the pilot initiated signals or the automatic pilot signals or the mixed signals are subject to the nonlinearities in 12, 14 of the link 10.

In order to eliminate the effect of these nonlinearities of the link 10 there is provided according to the invention an internal closed loop control 20 having a first pick-up or signal transducer 22 operatively connected to an input sensor point 24 of the link 10 upstream of the signal mixing stage 42. A second pick-up 26 or signal transducer is connected to an output sensor point 28 at the output A of the link 10. The pick-ups or transducers 22, 26 produce from the mechanical input and output of the link 10 respective electrical signals which are supplied to a comparator or difference network 30. The network 30 provides at its output a difference signal s. The signal s is then further processed in the internal closed loop control in accordance with its control function or characteristic reading as follows:

$$x = s + V_1 \frac{ds}{dt} + V_2 \frac{d^2s}{dt^2} + \dots ,$$

wherein $V_1$ and $V_2$ are preselected amplification factors, wherein s is the difference signal from the output of the comparator 30, wherein t designates time and wherein d is the differentiating symbol. This control function is realized by a differentiation stage 32 which damps the signal s and stabilizes the internal closed loop control 20 by adding the differential components to the signal as indicated by the above equation. The signal x appears at the output of the differentiation stage 32 and is supplied to one input of a second comparator 34, the other input of which receives the flight control signal w from the automatic pilot 18. The flight control signal w forms a further reference value in addition to the reference value provided by the pilot initiated signals δ1 and δ2. The comparator 34 forms from the signals x and w the internal control deviation signal e at its output.

According to the invention the internal control deviation signal e is supplied to the input of an integrating circuit stage 36, the output of which is connected to an amplifier stage 38. The amplifier 38 has such an amplification characteristic, as indicated by the symbol in the block 38, that it provides a higher amplification for small integrated output signals from the integrating circuit 36 while providing a smaller amplification for larger output values from the integrator 36. However, in many instances a linear amplification characteristic for the amplifier 38 will be satisfactory.

The integrated and amplified control deviation becomes the correction signal y which is supplied to the electro or electro-hydraulic servodrive 40 which converts the electrical correction signal y into a corresponding mechanical correction signal which is then applied to the other input of the signal mixing or combining stage 42.

Thus, the internal closed loop control 20 provides a relatively highly amplified correction signal y which rises even in response to a small control deviation e rapidly and until the negative feedback becomes sufficiently effective. Accordingly, the control passes, so to speak, continuously with a high frequency through the hysteresis width of the mechanical control link 10, whereby the destabilizing nonlinearities 12, 14, or rather the effects thereof, are eliminated between the input sensor point 24 and the output sensor point 28.

By selecting the amplification factor of the amplifier 38 it is possible to increase the transmission precision or accuracy and the frequency of passing through the hysteresis width as desired within the stability limits of the mechanical control link. These stability limits result from the higher frequency dynamic components of the characteristic of the system. An additional advantage of the invention, particularly with respect to the stability of the system is seen in the use of the differentiation stage 32 which forms a closed loop control function which has a stabilizing effect on the internal closed loop control 20 due to the above mentioned damping. Another advantage is seen in using the automatic pilot output signal w as a reference value for the internal closed loop 20, whereby the correction signal y is adapted to the output signal w of the automatic pilot. Thus, even for very high amplifications of the automatic pilot output signal w continuous oscillations of the flight dynamic characteristics downstream of the flight control system 2 are effectively eliminated without any reduction in the accuracy of the closed loop control precision.

Although the invention has been described with reference to specific example embodiments, it will be appreciated that it is intended to cover all modifications and equivalents within the scope of the appended claims.

What is claimed is:

1. A flight control system, especially for helicopters, comprising mechanical control link means (10) having inherent destabilizing characteristics and including an input (E) and an output (A), internal control circuit means (20) for providing a control correction signal (y), said internal control circuit means comprising first pick-up means (22) operatively connected to the input (E) of the mechanical control link means (10) for providing a first input signal value derived from the input of said mechanical control link means (10) to said internal control circuit means (20), second pick-up means (26) operatively connected to the output (A) of the mechanical control link means (10) for providing a measured output signal value derived from the output of the mechanical control link means (10) as a second signal input value to said internal control circuit means (20), signal combining means (42) operatively connected between said input (E) and said output (A) for receiving said first input signal value and said control correction signal (y), said internal control circuit means (20) further comprising signal processing means for producing a combined signal (s) derived from said first and second input signal values provided by said first and second pick-up means (22, 26), control drive means (40) having an output connected to said signal combining means (42) and a control input, and signal integrating means (36) operatively connected in series between said signal processing means and said control input of said control drive means (40) for supplying said control correction signal (y) as an integrated signal derived from said combined signal (s) through said control drive means (40) to said signal combining means (42) for neutralizing said destabilizing characteristics.

2. The system of claim 1, further comprising signal amplifier means (38) electrically connected in series with said signal integrating means (36) and with said control drive means (40) for amplifying the integrated control correction signal (y) in accordance with a predetermined amplifying characteristic.

3. The system of claim 1, wherein said signal processing means further comprising a signal differentiating stage (32) for damping said combined signal (s) to form a differentiated signal (x) supplied to said signal integrating means (36).

4. The system of claim 2, wherein said signal processing means further comprising a signal differentiating stage (32) for damping said combined signal (s) to form a differentiated signal (x) supplied to said signal integrating means (36).

5. The system of claim 1, wherein said internal control circuit means further comprising a signal comparator (34) for producing an internal control deviation signal (e), said signal comparator (34) having a first input operatively connected to said signal processing means and a second input connected to receive flight control input signals, said signal comparator (34) having an output operatively connected to said signal integrating means (36) for supplying said internal control deviation signal (e) to said signal integrating means (36).

6. The system of claim 5, wherein said signal processing means further comprising a signal differentiating stage (32) operatively connected to said first input of said signal comparator (34) for damping said combined signal (s) before supplying said difference signal (s) to said signal comparator (34).

7. The system of claim 1, further comprising signal amplifier means (38) connected in series with said signal integrating means (36) for amplifying said combined signal (s) to produce said control correction signal (y).

8. A method for neutralizing destabilizing characteristics of mechanical control link means having an input (E) and an output (A) in a flight control system, especially for a helicopter, comprising the following steps:
   (a) producing a difference signal(s) between a pilot initiated first input signal measured at said input (E)

and a second input signal measured at said output (A), (b) integrating said difference signal (s) for providing an integrated control correction signal (y), (c) operating a control drive means (40) in response to said integrated control correction signal (y) in a closed loop manner, (d) combining (at 42) an output of said control drive means (40) with said pilot initiated first input signal for producing a corrected control signal for said mechanical control link means, and (e) operating said mechanical control link means by applying said corrected control signal to said mechanical control link means.

9. The method of claim 8, further comprising differentiating said difference signal (s) for damping said difference signal prior to its integrating.

10. The method of claim 9, further combining said damped difference signal with flight control input signals (w) prior to integrating.

11. The method of claim 8, further comprising combining said difference signal (s) with flight control input signals (w) prior to integrating.

* * * * *

UNITED STATES PATENT AND TRADEMARK OFFICE
CERTIFICATE OF CORRECTION

PATENT NO. : 4,573,125
DATED : February 25, 1986
INVENTOR(S) : Herbert Koenig

It is certified that error appears in the above-identified patent and that said Letters Patent are hereby corrected as shown below:

Claim 6, column 6, line 57, replace "difference" by --combined--.

Signed and Sealed this

Thirteenth Day of May 1986

[SEAL]

Attest:

DONALD J. QUIGG

Attesting Officer

Commissioner of Patents and Trademarks